United States Patent [19]

Kuitems

[11] Patent Number: 5,104,064
[45] Date of Patent: Apr. 14, 1992

[54] PALLET END STOP

[75] Inventor: Henry A. Kuitems, Hacienda Heights, Calif.

[73] Assignee: The United States of America as represented by the Secretary of the Air Force, Washington, D.C.

[21] Appl. No.: 548,456

[22] Filed: Jul. 2, 1990

[51] Int. Cl.⁵ .................... B64C 1/20; B61D 45/00
[52] U.S. Cl. .................. 244/118.1; 244/137.1; 410/69; 410/86; 410/107
[58] Field of Search ............... 244/118.1, 137.3, 137.4; 410/69, 83, 87, 86, 101, 107, 111

[56] References Cited

U.S. PATENT DOCUMENTS

| 759,113 | 3/1904 | Kimball et al. | |
|---|---|---|---|
| 917,540 | 4/1909 | Carr. | |
| 3,799,064 | 3/1974 | Kikuchi et al. | 104/256 |
| 3,986,460 | 10/1976 | Voight et al. | 410/69 |
| 4,415,298 | 11/1983 | Voight | 410/69 |
| 4,572,080 | 2/1986 | Williams et al. | 104/252 |
| 4,583,896 | 4/1986 | Vogg | 244/118.1 |
| 4,779,824 | 10/1988 | Leger | 244/137.3 |

FOREIGN PATENT DOCUMENTS 2089884 6/1982 United Kingdom ............. 244/137.3

Primary Examiner—Joseph F. Peters, Jr.
Assistant Examiner—Virna Lissi Mojica
Attorney, Agent, or Firm—Fredric L. Sinder; Donald J. Singer

[57] ABSTRACT

A floor-mounted, retractable, energy absorbing pallet end stop assembly for use in cargo aircraft and the like is described. The pallet end stop assembly mounts in the forward portion of an aircraft to stop and hold in place rows of cargo pallets. The pallet end stop rotates from a stowed position level with the cargo deck to a released position above the cargo deck. A lower half of the pallet end stop includes a pair of arcuate slots. A shock absorber is mounted beneath the deck and is slidably attached at one end to the arcuate slots. A release mechanism is also mounted in the floor so that, when pressed down, the release mechanism rotates and an integral tooth slides a latch pin, through a notch in the latch pin, against a spring away from a lip on the pallet end stop to thereby free the pallet end stop from its stowed position. As the pallet end stop rotates, from the force of a torsion spring, the end of the shock absorber attached to the arcuate slots remains largely stationary while merely riding inside the slots. When the shock absorber end reaches the end of the slots, it begins to extend to absorb energy as the pallet end stop completes its opening rotation. When the pallet end stop is returned to its stowed position, the shape of the arcuate slots acts to recompress the shock absorber.

9 Claims, 5 Drawing Sheets

PALLET END STOP

RIGHTS OF THE GOVERNMENT

The invention described herein may be manufactured and used by or for the Government of the United States for all governmental purposes without the payment of any royalty.

BACKGROUND OF THE INVENTION

The present invention relates generally to cargo handling systems, and more specifically to a floor-mounted, retractable, energy absorbing pallet end stop assembly for use in cargo aircraft and the like.

Cargo is frequently stored on pallets to make it easier to move inside and between cargo facilities. When pallets, singly or in a roll, are moved into a desired position, an end stop generally must be provided to both halt the moving pallet and to then hold the pallet in place. Heavy moving pallets represent a large amount of energy that must be absorbed by the pallet end stop without breaking and without imparting too great a jolt either to the cargo stored on the pallet or to the structure to which the pallet end stop is attached, especially when that structure is an airframe. It is also desirable that the pallet end stop be retractable so that pallets and other cargo can be freely moved over the cargo floor when the end stop is not needed.

Prior art pallet end stops in cargo aircraft are not retractable, but must be completely lifted off the aircraft cargo deck. They are also not energy absorbing. Large rubber chocks have been tried in aircraft for their energy absorbing ability, but they have not proved successful because they become too hard in cold climates and too soft in hot climates.

The prior art for railroad and mining car stops does include retractable, energy absorbing stops. Those stops, however, are necessarily large and unwieldy, generally requiring another large mechanical mechanism to raise and lower them. Pallet end stops for use with typical cargo pallets need to be able to be easily manually actuated and similarly easily manually returned to a retracted position. Thus it is seen that there is a need for appropriately sized, energy absorbing, retractable, manually actuated pallet end stops suitable for use in cargo aircraft and the like.

It is, therefore, a principal object of the present invention to provide a manually actuated pallet end stop suitable for use in cargo aircraft and the like.

It is a feature of the present invention that it is both easily manually actuated and easily returned to a stowed position.

It is another feature of the present invention that it actuates rapidly.

It is a further feature of the present invention that it lies flush with a cargo deck until actuated.

It is yet another feature of the present invention that it is readily available for use.

It is an advantage of the present invention that it absorbs, after rapid initial actuation, the impact energy of a moving pallet.

It is another advantage of the present invention that it can be assembled with existing parts or straightforward modification of existing parts.

It is a further advantage of the present invention that it is a mechanical system that operates the same in both hot and cold climates.

It is yet another advantage of the present invention that it is also particularly suitable for use with ground support equipment.

These and other objects, features and advantages of the present invention will become apparent as the description of certain representative embodiments proceeds.

SUMMARY OF THE INVENTION

The present invention provides a novel pallet end stop assembly. The unique discovery of the present invention is that allowing an initial partial actuation of the pallet end stop, before energy absorption takes place, makes that partial actuation very rapid, so that overall actuation is very fast, but with no loss of energy absorbing ability or imparting an initial jolt to cargo pallets.

Accordingly, the present invention is directed to a pallet end stop assembly for use with a cargo deck comprising a pallet end stop, which pallet end stop includes an upper end shaped to, when raised above the deck in a released position, engage a pallet and, when level with the deck in a stowed position, not protrude above the deck, an opening for a pivot for rotating the upper end from between its released position above the deck and its stowed position level with the deck and a lower end, first spring means, operatively connected to the pallet end stop, for resiliently rotationally biasing the pallet end stop toward its released position, an energy absorber attached at a first end beneath the cargo deck and having a second end, attachment means for attaching the energy absorber second end to the lower end of the pallet end stop, wherein the attachment means includes means for allowing an initial partial rotation of the pallet end stop from its stowed position to its released position without energy absorption by the energy absorber, holding means for holding the pallet end stop in its stowed position and release means for releasing the holding means from the pallet end stop so that the pallet end stop will rotate, under the force of the first spring means, toward its released position. The means for allowing initial partial rotation of the pallet end stop with energy absorption by the energy absorber may comprise, on the pallet stop lower end, one or more arcuate open slots and, as part of the attachment means, means for slidably attaching the energy absorber second end to the one or more slots in the lower end of the pallet end stop, wherein the one or more slots are shaped so that, when the pallet end stop rotates from its stowed to its released position, the second end of the energy absorber will remain substantially stationary, in a lateral direction, while sliding relative to the lower end of the rotating pallet end stop, until one end of the one or more slots contacts the second end of the energy absorber so that further rotation of the pallet end stop cannot occur without extension, and thereby energy absorption, of the energy absorber. The one or more slots can be shaped to push the second end of the energy absorber toward its first end when the pallet end stop is rotated toward its stowed position. The holding means may comprise a lip on the pallet end stop, a latch pin, having a notch, slidably mounted below the deck so that it will, in a first sliding position, engage the lip of the pallet end stop and hold the pallet end stop, against the resilience of the first spring, in its stowed position and, in a second sliding position, disengage from the lip of the pallet end stop, thereby freeing the pallet end stop to rotate, under the force of the first spring means, toward its released position and second spring means, operatively connected to the latch pin, for resiliently biasing the pin toward the first sliding position and the release means may comprise an upper end shaped to, when level with the deck, not protrude above the deck, an opening for a pivot for rotating the release means, a tooth for engaging the notch in the latch pin and whereby an externally applied downward force to the upper end of the release means will rotate the release means, thereby moving the tooth and, operatively through the notch, sliding the latch pin toward the second sliding position.

DESCRIPTION OF THE DRAWINGS

The present invention will be more clearly understood from a reading of the following detailed description in conjunction with the accompanying drawings wherein.

DETAILED DESCRIPTION

Figure 1:
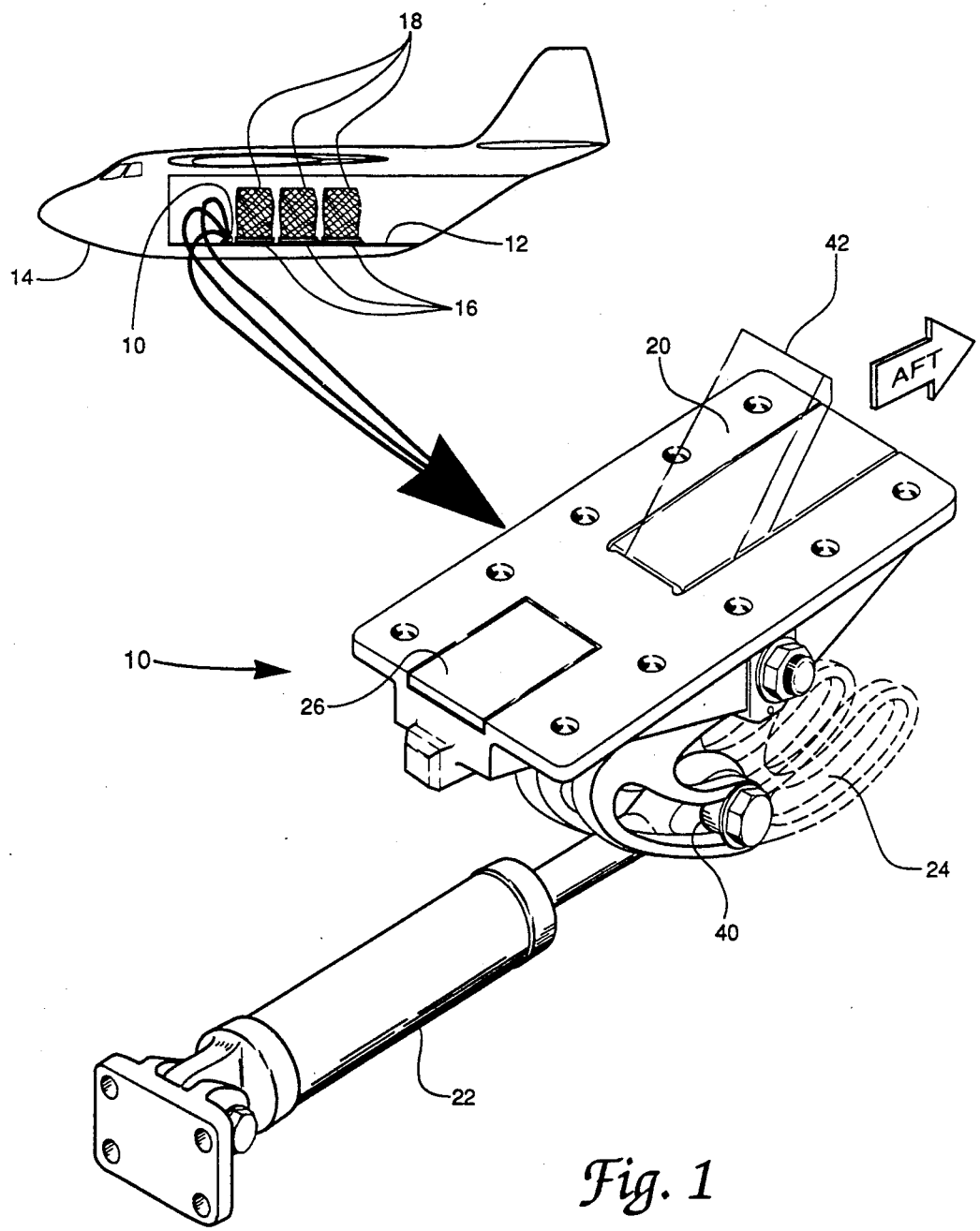
FIG. 1 is a perspective view of a pallet end stop assembly for mounting on an aircraft cargo deck according to the teachings of the present invention.

Referring now to FIG. 1 of the drawings, there is shown a perspective view of a pallet end stop assembly 10 for mounting on the cargo deck 12 of a cargo aircraft 14. Typically, a number of pallet end stop assemblies 10 will be installed in the forward portion of aircraft 14 to hold in place a number of rows of pallets 16 and their attached cargo 18.

Figure 6:
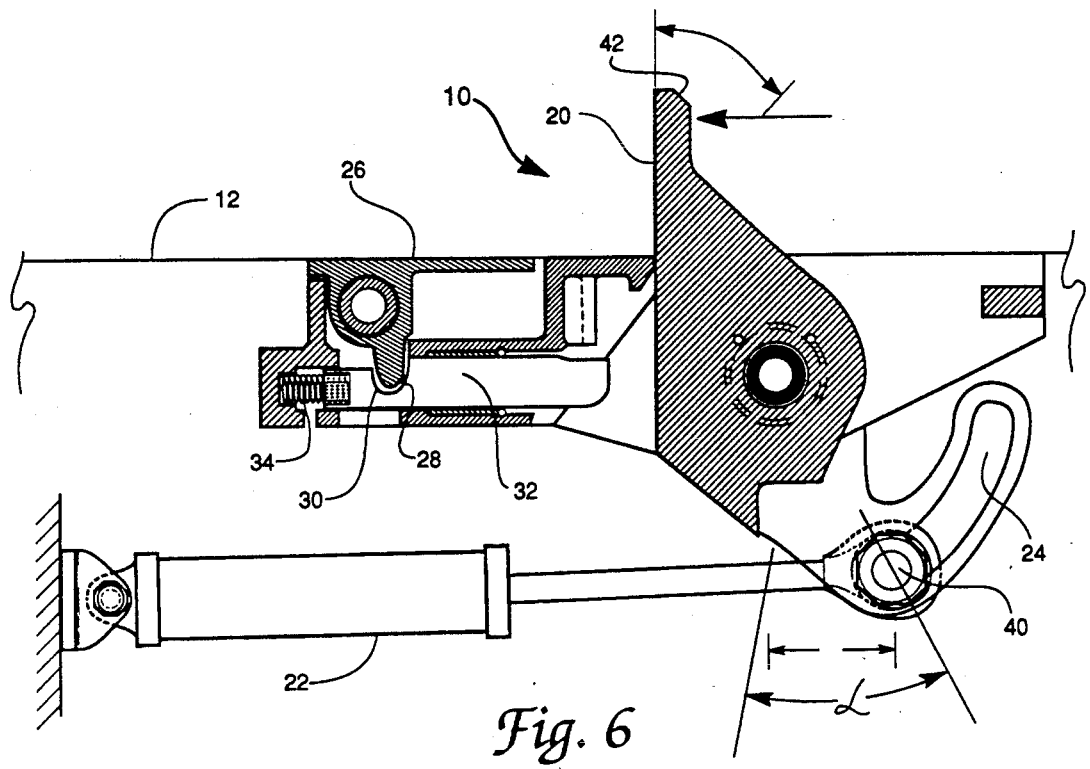
FIG. 6 is a cross-sectional view of the pallet end stop assembly of FIG. 1 showing the pallet end stop in its fully released position with the energy absorber fully extended.

Pallet end stop assembly 10 includes the pallet end stop 20 which rotates between a stowed position level with cargo deck 12 and a fully raised position as shown in the cross-sectional view of FIG. 6. A shock, or energy, absorber 20 is attached at one end to the aircraft structure beneath deck 12 and at the other to pallet end stop 20 through a pair of open arcuate slots 24. A release mechanism 26 releases pallet end stop 20 to rotate from its stowed to its released position.

Figure 2:
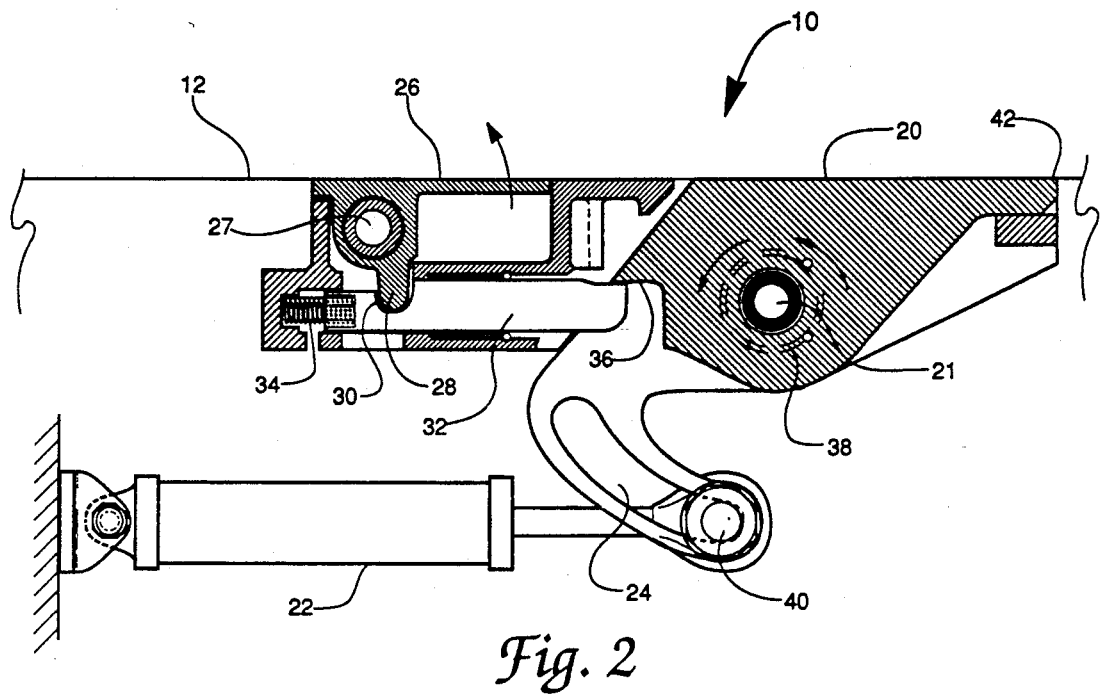
FIG. 2 is a cross-sectional view of the pallet end stop assembly of FIG. 1 showing the pallet end stop in its stowed position.
Figure 3:
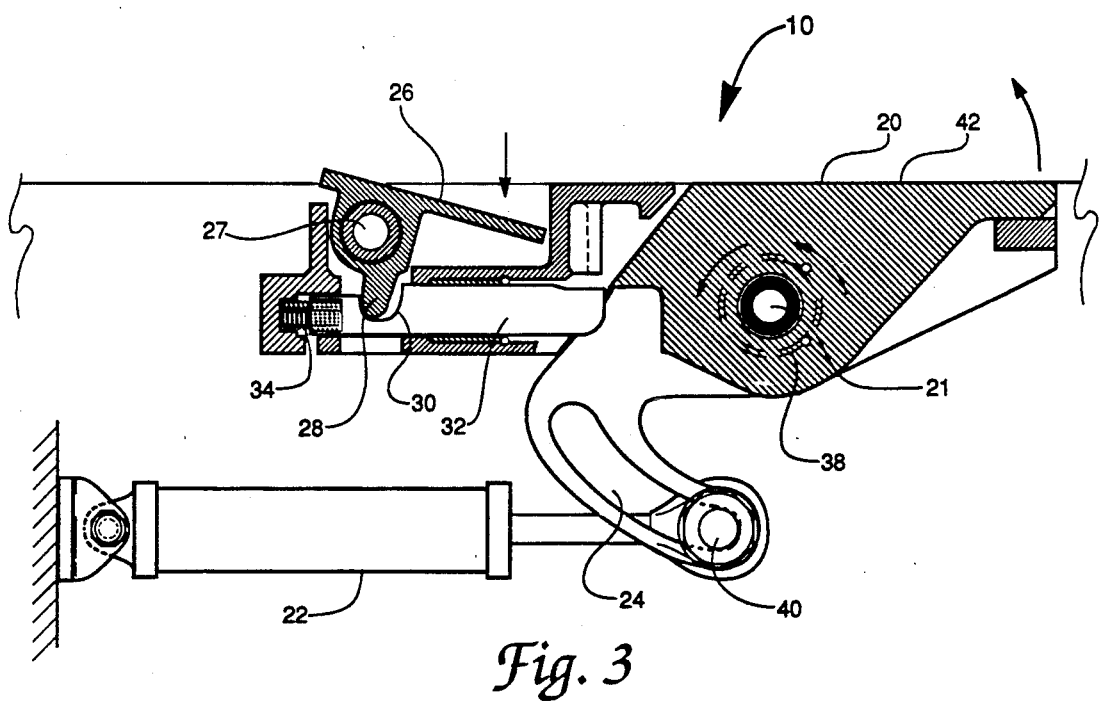
FIG. 3 is a cross-sectional view of the pallet end stop assembly of FIG. 1 showing the pallet end stop in its stowed position with the release assembly just pressed and release of the pallet end stop imminent.
Figure 4:
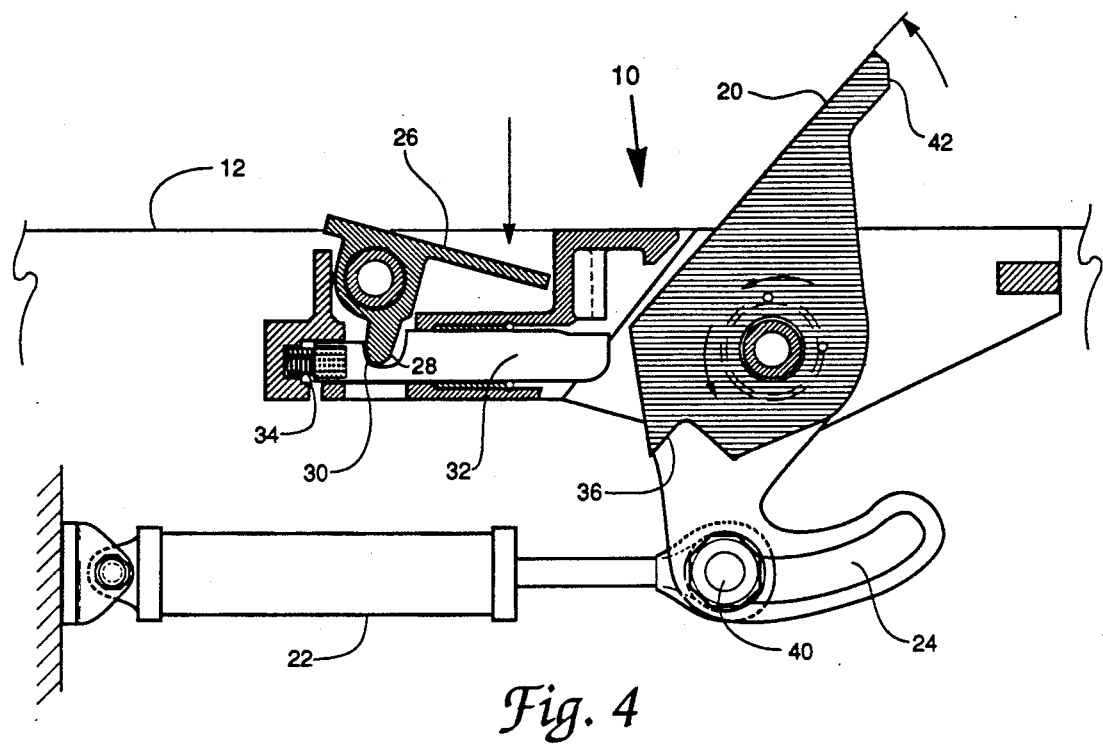
FIG. 4 is a cross-sectional view of the pallet end stop assembly of FIG. 1 showing the pallet end stop in its just released position.
Figure 5:
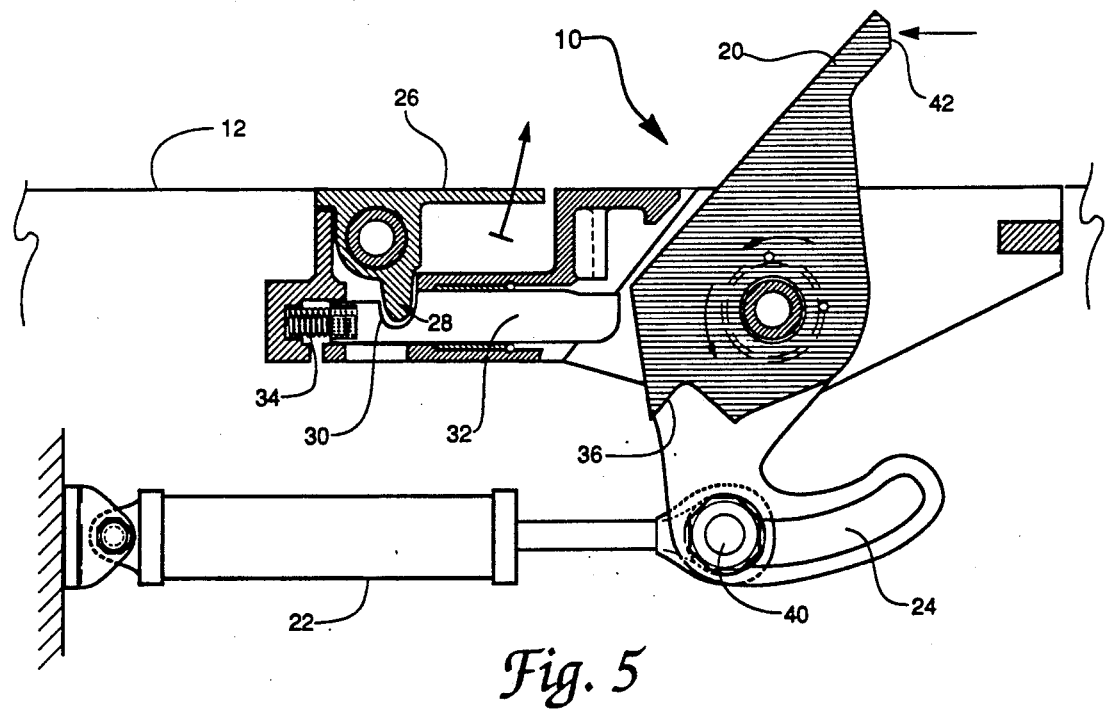
FIG. 5 is a cross-sectional view of the pallet end stop assembly of FIG. 1 showing the pallet end stop in a more released position with extension of the energy absorber about to begin.

Release mechanism 26, shown in more detail in the cross-sectional view of FIG. 2, which shows pallet end stop 20 in its stowed position, is pressed downward to release pallet end stop 20. When pressed, as shown in FIG. 3, release mechanism 26 rotates about a pivot hole 27 and a tooth 28, fitting into a notch 30, slides a latch pin 32 against a spring 34 to pull latch pin 32 away from a lip 36 on pallet end stop 20. A torsion spring 38, mostly hidden in this view, then rotates pallet end stop 20 around a pivot hole 21. Pallet end stop 20 rotates freely for a limited distance while an end 40 of energy absorber 22 slides inside slots 24. After pallet end stop 20 has partially rotated, energy absorber end 22 reaches the ends of slots 24, as shown in FIG. 4, and further rotation of pallet end stop 20 cannot occur without extension, and thereby energy absorption, of energy absorber 22. The upper end 42 of pallet end stop 20 is shaped to engage a cargo pallet at this point and continue to rotate until it reaches its fully released position as shown in FIG. 6.

Figure 7:
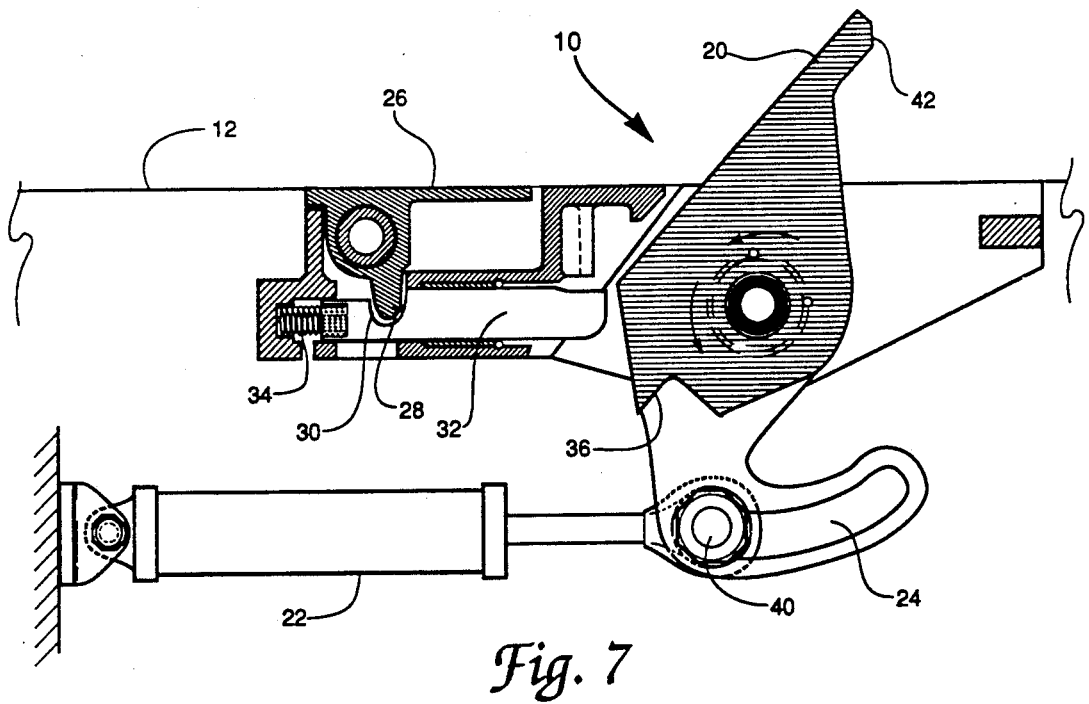
FIG. 7 is a cross-sectional view of the pallet end stop assembly of FIG. 1 showing the pallet end stop in its just beginning to be rotated toward its stowed position.
Figure 8:
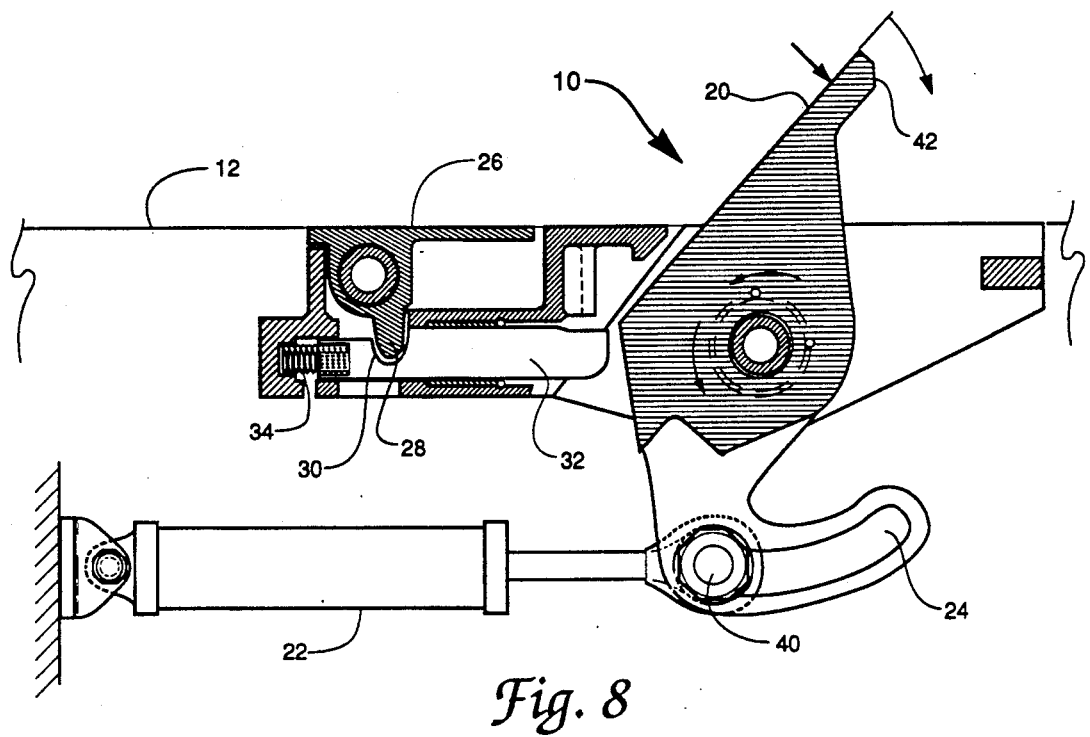
FIG. 8 is a cross-sectional view of the pallet end stop assembly of FIG. 1 showing the pallet end stop further rotated toward its stowed position; and, FIG. 9 is a cross-sectional view of the pallet end stop assembly of FIG. 1 showing the pallet end stop returned to its stowed position.
Figure 9:
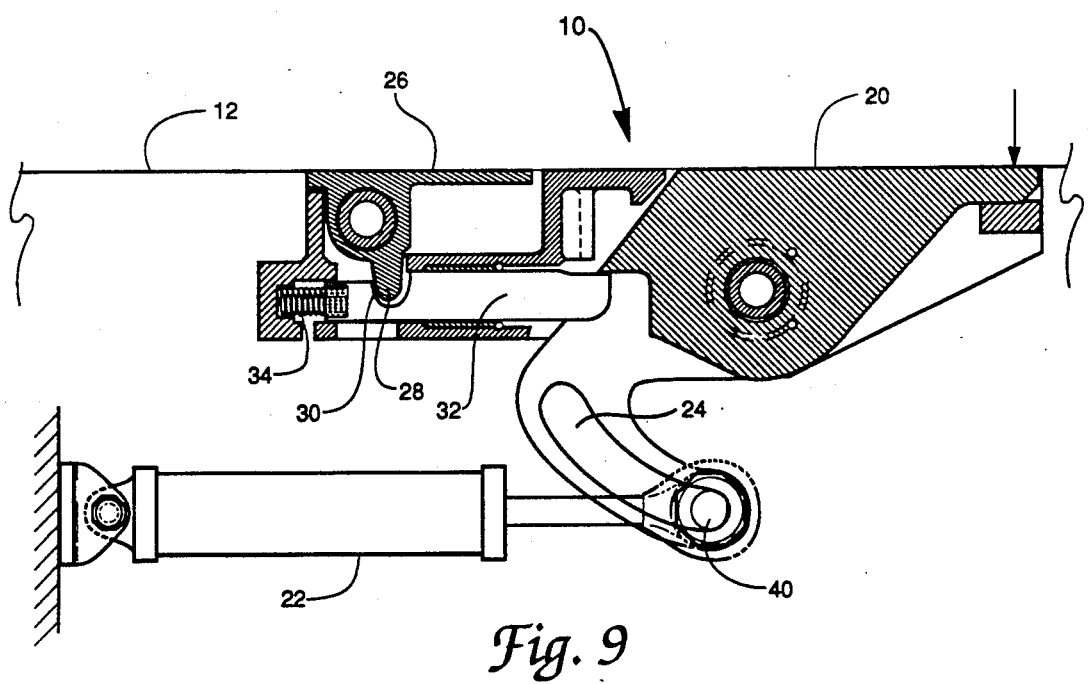

FIG. 7 shows pallet end stop 20, after a pallet has been removed, just beginning to be returned to its stowed position. FIGS. 8 and 9 show the completion of the return of pallet end stop 20 to its stowed position. Another unique feature of the present invention is shown by examination of FIGS. 8 and 9 in that the shape of slots 24 will tend, when pallet end stop 20 is returned to its stowed position, to automatically return energy absorber 22 to its compressed state ready to be used again.

Those with skill in the art of the invention will readily see that the disclosed pallet end stop assembly may be advantageously used for a variety of other purposes in addition its use in aircraft. For example, it is particularly suitable for use on the ground, both to restrain cargo pallets and to hold in place ground support equipment.

The disclosed pallet end stop assembly successfully demonstrates the use of a combination of elements to achieve a retractable, energy absorbing pallet end stop that can be rapidly actuated. Although the disclosed invention is specialized, its teachings will find application in other areas where equipment must be both energy absorbing and rapidly actuating.

It is understood that modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

I claim:

1. A pallet end stop assembly for use with a cargo deck, comprising:
   (a) a pallet end stop, including:
      (i) an upper end shaped to, when raised above the deck in a released position, engage a pallet and, when level with the deck in a stowed position, not protrude above the deck;
      (ii) an opening for a pivot for rotating the upper end from between its released position above the deck and its stowed position level with the deck; and,
      (iii) a lower end;
   (b) first spring means, operatively connected to the pallet end stop, for resiliently rotationally biasing the pallet end stop toward its released position;
   (c) an energy absorber attached at a first end beneath the cargo deck and having a second end;
   (d) attachment means for attaching the energy absorber second end to the lower end of the pallet end stop, wherein the attachment means includes means for allowing an initial partial rotation of the pallet end stop from its stowed position to its released position without energy absorption by the energy absorber;

(e) holding means for holding the pallet end stop in its stowed position; and, (f) release means for releasing the holding means from the pallet end stop so that the pallet end stop will rotate, under the force of the first spring means, toward its released position.

2. A pallet end stop assembly for use with a cargo deck, comprising:

(a) a pallet end stop, including:
  (i) an upper end shaped to, when raised above the deck in a released position, engage a pallet and, when level with the deck in a stowed position, not protrude above the deck;
  (ii) an opening for a pivot for rotating the upper end from between its released position above the deck and its stowed position level with the deck; and,
  (iii) a lower end;

(b) first spring means, operatively connected to the pallet end stop, for resiliently rotationally biasing the pallet end stop toward its released position;

(c) an energy absorber attached at a first end beneath the cargo deck and having a second end;

(d) attachment means for attaching the energy absorber second end to the lower end of the pallet end stop, wherein the attachment means includes means for allowing an initial partial rotation of the pallet end stop from its stowed position to its released position without energy absorption by the energy absorber, and wherein the means for allowing initial partial rotation of the pallet end stop with energy absorption by the energy absorber comprises:
  (i) on the pallet stop lower end, one or more arcuate open slots; and,
  (ii) as part of the attachment means, means for slidably attaching the energy absorber second end to the one or more slots in the lower end of the pallet end stop, wherein the one or more slots are shaped so that, when the pallet end stop rotates from its stowed to its released position, the second end of the energy absorber will remain substantially stationary, in a lateral direction, while sliding relative to the lower end of the rotating pallet end stop, until one end of the one or more slots contacts the second end of the energy absorber so that further rotation of the pallet end stop cannot occur without extension, and thereby energy absorption, of the energy absorber;

(e) holding means for holding the pallet end stop in its stowed position; and, (f) release means for releasing the holding means from the pallet end stop so that the pallet end stop will rotate, under the force of the first spring means, toward its released position.

3. The pallet end stop assembly according to claim 2, further wherein the one or more slots are shaped to push the second end of the energy absorber toward its first end when the pallet end stop is rotated toward its stowed position.

4. A pallet end stop assembly for use with a cargo deck, comprising:

(a) a pallet end stop, including:
  (i) an upper end shaped to, when raised above the deck in a released position, engage a pallet and, when level with the deck in a stowed position, not protrude above the deck;
  (ii) an opening for a pivot for rotating the upper end from between its released position above the deck and its stowed position level with the deck; and,
  (iii) a lower end;

(b) first spring means, operatively connected to the pallet end stop, for resiliently rotationally biasing the pallet end stop toward its released position;

(c) an energy absorber attached at a first end beneath the cargo deck and having a second end;

(d) attachment means for attaching the energy absorber second end to the lower end of the pallet end stop, wherein the attachment means includes means for allowing an initial partial rotation of the pallet end stop from its stowed position to its released position without energy absorption by the energy absorber;

(e) holding means for holding the pallet end stop in its stowed position; wherein the holding means comprises:
  (i) a lip on the pallet end stop;
  (ii) a latch pin, having a notch, slidably mounted below the deck so that it will, in a first sliding position, engage the lip of the pallet end stop and hold the pallet end stop, against the resilience of the first spring, in its stowed position and, in a second sliding position, disengage from the lip of the pallet end stop, thereby freeing the pallet end stop to rotate, under the force of the first spring means, toward its released position; and,
  (iii) second spring means, operatively connected to the latch pin, for resiliently biasing the pin toward the first sliding position; and, (f) release means for releasing the holding means from the pallet end stop so that the pallet end stop will rotate, under the force of the first spring means, toward its released position, wherein the release means comprise:
  (i) an upper end shaped to, when level with the deck, not protrude above the deck;
  (ii) an opening for a pivot for rotating the release means;
  (iii) a tooth for engaging the notch in the latch pin; and,
  (iv) whereby an externally applied downward force to the upper end of the release means will rotate the release means, thereby moving the tooth and, operatively through the notch, sliding the latch pin toward the second sliding position.

5. A pallet end stop assembly for use with a cargo deck, comprising:

(a) a pallet end stop, including:
  (i) an upper end shaped to, when raised above the deck in a released position, engage a pallet and, when level with the deck in a stowed position, not protrude above the deck;
  (ii) an opening for a pivot for rotating the upper end from between its released position above the deck and its stowed position level with the deck;
  (iv) a lower end having one or more arcuate open slots;

(b) first spring means, operatively connected to the pallet end stop, for resiliently rotationally biasing the pallet end stop toward its released position;

(c) an energy absorber fixably, in a lateral direction parallel to the deck, attached at a first end beneath the cargo deck and slidably attached at a second end to the one or more slots in the lower end of the pallet end stop, wherein the one or more slots are shaped so that, when the pallet end stop rotates from its stowed to its released position, the second end of the energy absorber will remain substantially stationary, in the lateral direction, while sliding, inside the one or more slots, relative to the rotating pallet end stop, until one end of the one or more slots contacts the second end of the energy absorber so that further rotation of the pallet end stop cannot occur without extension, and thereby energy absorption, of the energy absorber;

(d) holding means for holding the pallet end stop in its stowed position; and, (e) release means for releasing the holding means from the pallet end stop so that the pallet end stop will rotate, under the force of the first spring means, toward its released position.

6. The pallet end stop assembly according to claim 5, further wherein the one or more slots are shaped to push the second end of the energy absorber toward its first end when the pallet end stop is rotated toward its stowed position.

7. The pallet end stop assembly according to claim 5, wherein:

(a) the holding means comprise:
  (i) a lip on the pallet end stop;
  (ii) a pin, having a notch, slidably mounted below the deck so that it will, in a first sliding position, engage the lip of the pallet end stop and hold the pallet end stop, against the resilience of the first spring, in its stowed position and, in a second sliding position, disengage from the lip of the pallet end stop, thereby freeing the pallet end stop to rotate, under the force of the first spring means, toward its released position;
  (iii) second spring means, operatively connected to the pin, for resiliently biasing the pin toward the first sliding position; and, (b) the release means comprise:
  (i) an upper end shaped to, when level with the deck, not protrude above the deck;
  (ii) an opening for a pivot for rotating the release means;
  (iii) a tooth for engaging the notch in the latch pin; and,
  (iv) whereby an externally applied downward force to the upper end of the release means will rotate the release means, thereby moving the tooth and, operatively through the notch, sliding the latch pin toward the second sliding position.

8. A pallet end stop assembly for use with a cargo deck, comprising:

(a) a pallet end stop, including:
  (i) an upper end shaped to, when raised above the deck in a released position, engage a pallet and, when level with the deck in a stowed position, not protrude above the deck;
  (ii) an opening for a pivot for rotating the upper end from between its released position above the deck and its stowed position level with the deck;
  (iii) a lip for engaging a latch pin; and,
  (iv) a lower end having one or more arcuate open slots;

(b) first spring means, operatively connected to the pallet end stop, for resiliently rotationally biasing the pallet end stop toward its released position;

(c) an energy absorber fixably, in a lateral direction parallel to the deck, attached at a first end beneath the cargo deck and slidably attached at a second end to the one or more slots in the lower end of the pallet end stop, wherein the one or more slots are shaped so that, when the pallet end stop rotates from its stowed to its released position, the second end of the energy absorber will remain substantially stationary, in the lateral direction, while sliding, inside the one or more slots, relative to the rotating pallet end stop, until one end of the one or more slots contacts the second end of the energy absorber so that further rotation of the pallet end stop cannot occur without extension, and thereby energy absorption, of the energy absorber;

(d) a latch pin, having a notch, slidably mounted below the deck so that it will, in a first sliding position, engage the lip of the pallet end stop and hold the pallet end stop, against the resilience of the first spring, in its stowed position and, in a second sliding position, disengage from the lip of the pallet end stop, thereby freeing the pallet end stop to rotate, under the force of the first spring means, toward its released position;

(e) second spring means, operatively connected to the latch pin, for resiliently biasing the latch pin toward the first sliding position; and, (f) release means, including:
  (i) an upper end shaped to, when level with the deck, not protrude above the deck;
  (ii) an opening for a pivot for rotating the release means;
  (iii) a tooth for engaging the notch in the latch pin; and,
  (iv) whereby an externally applied downward force to the upper end of the release means will rotate the release means, thereby moving the tooth and, operatively through the notch, sliding the latch pin toward the second sliding position.

9. The pallet end stop assembly according to claim 8, further wherein the one or more slots are shaped to push the second end of the energy absorber toward its first end when the pallet end stop is rotated toward its stowed position.

* * * * *